United States Patent [19]

Lofland

[11] Patent Number: 5,440,789

[45] Date of Patent: Aug. 15, 1995

[54] SCISSORS-TYPE CLAMPS AND CLAMPING ASSEMBLIES

[75] Inventor: James A. Lofland, Milford, Del.

[73] Assignee: Mohawk Plastic Products, Inc., Milford, Del.

[21] Appl. No.: 202,379

[22] Filed: Feb. 28, 1994

[51] Int. Cl.⁶ .............................................. F16G 11/00
[52] U.S. Cl. ........................... 24/132 R; 24/132 WL; 24/543
[58] Field of Search ...... 24/132 R, 132 AA, 132 WL, 24/136 L, 543

[56] References Cited

U.S. PATENT DOCUMENTS

| | | | |
|---|---|---|---|
| 39,335 | 7/1863 | Beckman | 24/132 R |
| 1,168,559 | 1/1916 | Rodin | 24/132 WL |
| 1,373,078 | 3/1921 | Kerr | 24/132 R |
| 3,161,724 | 12/1964 | Greene, Jr. et al. | 24/132 R |
| 3,670,372 | 6/1972 | Crosby et al. | 24/132 WL |
| 3,896,527 | 7/1975 | Miller et al. | 24/132 R |
| 4,157,602 | 6/1979 | Bennell | 24/370 |
| 4,382,453 | 5/1983 | Bujan et al. | 24/543 |
| 4,493,134 | 1/1985 | Karr | 24/132 R |

FOREIGN PATENT DOCUMENTS

0007426 of 1908 United Kingdom ............ 24/132 R

*Primary Examiner*—Victor N. Sakran
*Attorney, Agent, or Firm*—Connolly and Hutz

[57] ABSTRACT

The present invention relates to scissors-type clamps and clamping assemblies.

18 Claims, 8 Drawing Sheets

SCISSORS-TYPE CLAMPS AND CLAMPING ASSEMBLIES

BACKGROUND OF THE INVENTION

1. Field of the Invention

The present invention relates to scissors-type clamps and clamping assemblies.

2. Related Patents

U.S. Pat. No. Des. 339,057, which issued on Sep. 7, 1993, in the name of James A. Lofland, describes a scissors-type lockout clamp which is similar to several of the embodiments of the present invention. The entire disclosure of this related patent is expressly incorporated herein by reference.

BRIEF DESCRIPTION OF THE PRIOR ART

The present invention relates generally to cable-type locking assemblies.

SUMMARY OF THE INVENTION

The present invention relates to scissors-type clamps and clamping assemblies,

The scissors-type clamps of the present invention are designed to clamp cables so as to prevent the movement of the cable through the clamp, The combination of at least one of the scissors-type clamps and at least one cable form the clamping assemblies of the present invention.

The clamping assemblies of the present invention may be used in combination with locking devices so as to form secure (i.e., locked) clamping assemblies.

DESCRIPTION OF THE PREFERRED EMBODIMENTS

The present invention relates to scissors-type clamps and clamping assemblies.

Figure 1:
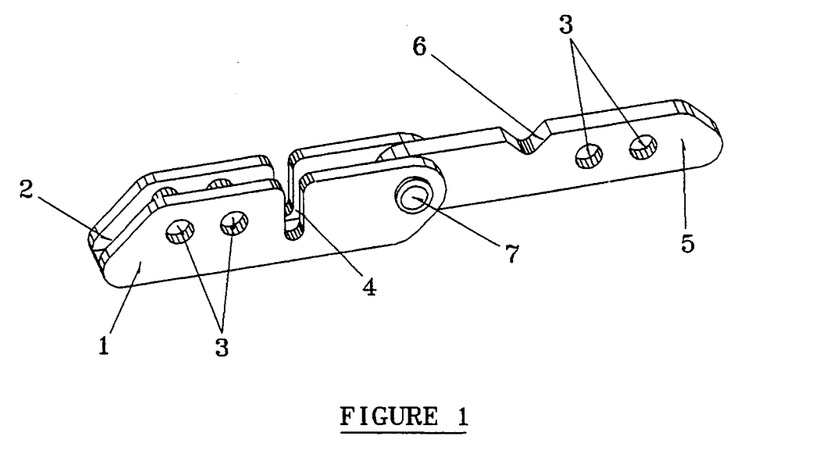
FIG. 1 is an elevated side view of a scissors-type clamp of the present invention in an open position.
Figure 3:
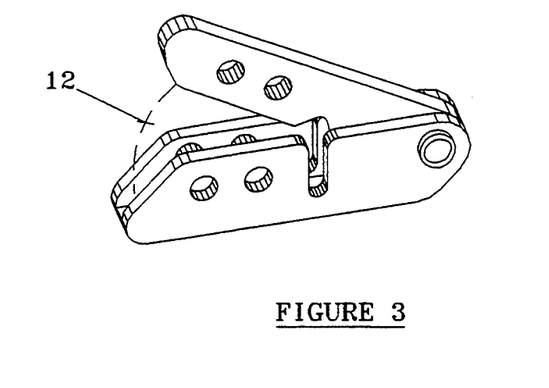
FIG. 3 is an elevated side view of a scissors-type clamp of the present invention which is opened to a 45° angle.

The scissors-type clamp of the present invention comprises two sections which are pivotally attached at a pivotal attachment point. Referring to FIG. 1, the first section of the clamp (1) has a channel (2), at least one through hole (3) and at least one through slot (4). The second section of the clamp (5) has at least one through hole (3) and at least one notch (6). Any means may be used to attach the two sections of the clamp, as long as the means used permits at least some movement of the first section with respect to the second section (or vice-versa). In a preferred embodiment of the present invention, the attachment means permits the second section to pivot at least 10° from the first section (where the 10° is measured from a horizontal line running parallel to the base of the channel in the first section). In a more preferred embodiment of the present invention, the attachment means permits the second section to pivot at least 45° from the first section (where the 45° is measured as described above, see FIG. 3 where the 45° angle is indicated as 12). In a most preferred embodiment of the present invention, the attachment means permits the second section to pivot at least 90° from the first section (where the 90° is measured as described above).

Figure 2:
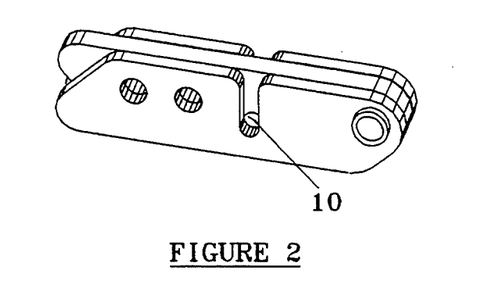
FIG. 2 is an elevated side view of a scissors-type clamp of the present invention in a closed position.

The pivotal attachment point (7) is located so that the channel in the first section of the clamp engages said second section when said clamp is in a closed position (shown in Figure 2). Moreover, the pivotal attachment point is located so that when the clamp is in a closed position, the through hole(s) in the first section are aligned with the through hole(s) in the second section and the at least one notch in the second section is aligned with the at least one through slot in the first section (as shown by lead line 10 in FIG. 2). When the through holes are aligned in this manner, it is possible to insert a member through each corresponding set(s) of through holes in the first and second sections. Moreover, when the through holes are aligned (i.e., when the clamp is in a closed position) the at least one notch in the second section will be aligned with the at least one through slot in the first section in such a manner that a cable, which passes through a through slot of the first section, will be held in place or clamped by the bottom of the through slot in the first section and the corresponding notch in the second section. Therefore, when a cable is clamped between the bottom of the through slot in the first section and the notch in the second section, and a member is inserted through a corresponding set of through holes (for example, the member could be a rod or the shank of a padlock), the cable becomes locked in place because the member prevents the two sections of the clamp from pivoting (i.e., opening).

Figure 5:
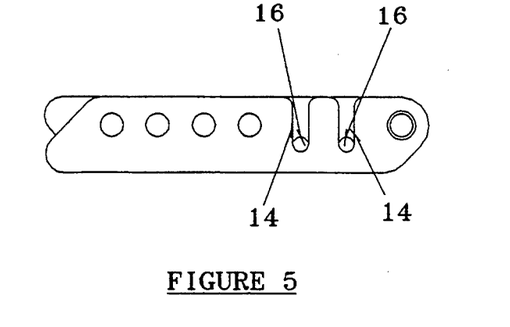
FIG. 5 is a side view of a scissors-type clamp of the present invention which has two through slot/notch pairs.

When the first section of the clamp has more than one through slot and the second section has more than one notch, the corresponding pairs of slots and notches should be aligned when the clamp is in a closed position so that each slot/notch pair could clamp a cable that passes through that through slot. In this embodiment of the present invention, it is possible for more than one cable (or for two or more portions of the same cable) to be clamped by one of the scissors-type clamps of the present invention. It may be necessary, when more than one slot/notch pair is used, to vary the depth of the through slots or notches so that the clamp will be able to fully close. For example, the depth of the through slot and/or notch that is closest to the pivotal attachment point may need to be greater than the depth of the through slot and/or notch that is the second closest to the pivotal attachment point and the depth of the through slot and/or notch that is second closest to the pivotal attachment point may need to be greater than the depth of the through slot and/or notch that is third closest to the pivotal attachment point and so on. An example of this embodiment of the present invention is shown in FIG. 5 wherein a scissors-type clamp having two through slots 14 and two notches 16 is shown in a closed position.

In another embodiment of the present invention, the at least one through slot may be located on the second section and the at least one notch may be located on the first section.

Figure 4:
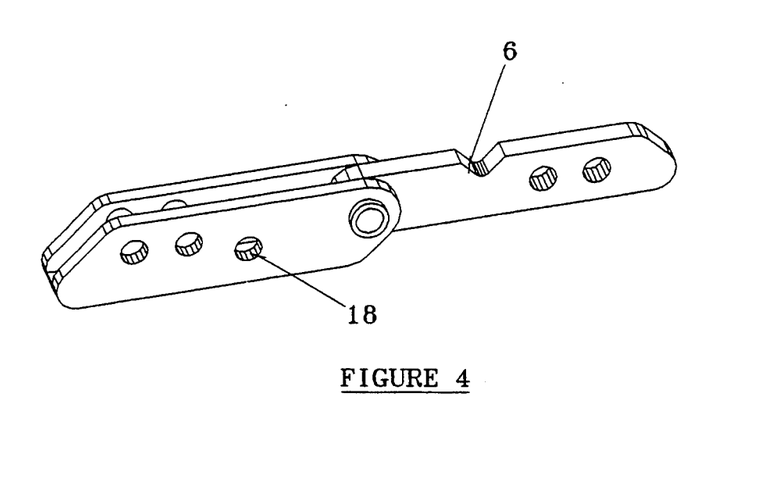
FIG. 4 is an elevated side view of a scissors-type clamp of the prurient invention which has a through hole (18) in which a cable can be clamped.

In yet another embodiment of the present invention, illustrated in FIG. 4, the at least one through slot in the first section of the clamp is replaced by a through hole 18 which is located so that when the clamp is in a closed position, the notch in the second section 6 is aligned with the through hole. In this embodiment of the present invention, the cable is inserted through the through hole while the clamp is in an open position. The clamp is then closed so that the notch in the second section and the bottom edges of the through hole in the first section exert force on the cable, thereby clamping the cable in place.

Figure 6:
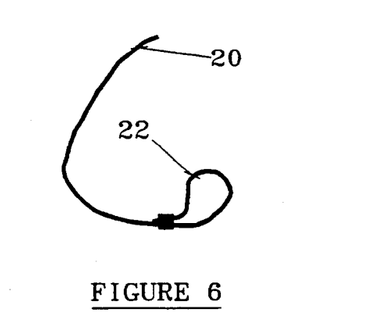
FIG. 6 shows a cable for use in the present invention wherein the cable has a free end and a looped end.
Figure 7:
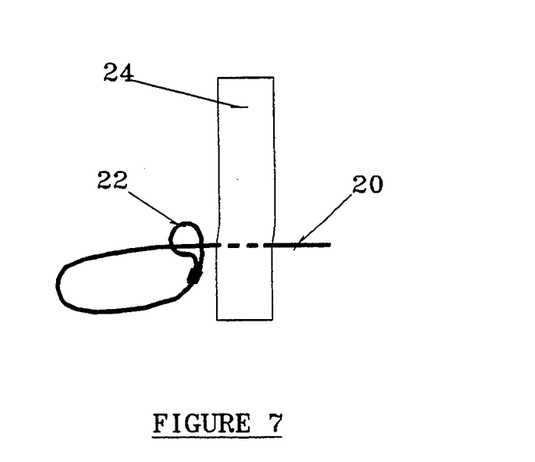
FIG. 7 shows a clamping assembly of the present invention in use.

The present invention is also directed to clamping assemblies comprising at least one scissors-type clamp and at least one cable. For example, in one embodiment of the present invention, a scissors-type clamp is used in combination with a cable that has one free end and one looped end (shown in FIG. 6 where 20 indicates the free end and 22 indicates the looped end). The cable is passed around an object or objects to be held in place and then around a fixed object (such as a post or a car rack) before the free end of the cable is passed through the looped end and pulled tight so as to tie the object or objects to the fixed object. The free end of the cable is then placed in the through slot of the scissors-type clamp and the clamp is closed, thus preventing the free end of the cable from passing back through the looped end of the cable (shown in FIG. 7 where 20 indicates the free end, 22 indicates the looped end and 24 indicates the clamp). This assembly will hold the object or objects in place and tied to the fixed object.

In another embodiment of the present invention, the cable is passed through an object which is to be locked and then through a fixed object. The free end of the cable is then passed through the looped end and through the through hole in a scissors-type clamp. The scissors-type clamp is then closed so as to clamp the cable between the bottom of the through hole and the notch and the shank of a locking device is passed through one of the aligned sets of through holes in the scissors-type clamp. When the locking device is then locked, the clamping assembly will prevent the object from being removed from the fixed object until the lock is unlocked and the shank of the lock removed from the through holes in the clamp.

In another embodiment of the present invention, the scissors type clamp has two through slots and two corresponding notches so that two sections of a cable can be held by the clamp. In this embodiment, a straight piece of cable can be used to tie down an object by passing the cable around the object and around a fixed object. The two free ends of the cable are then passed through the two through slots of the clamp and the clamp is closed. If the object is to be locked in place, the shank(s) of one or more locks can be passed through the through holes of the clamp and then locked.

Figure 8:
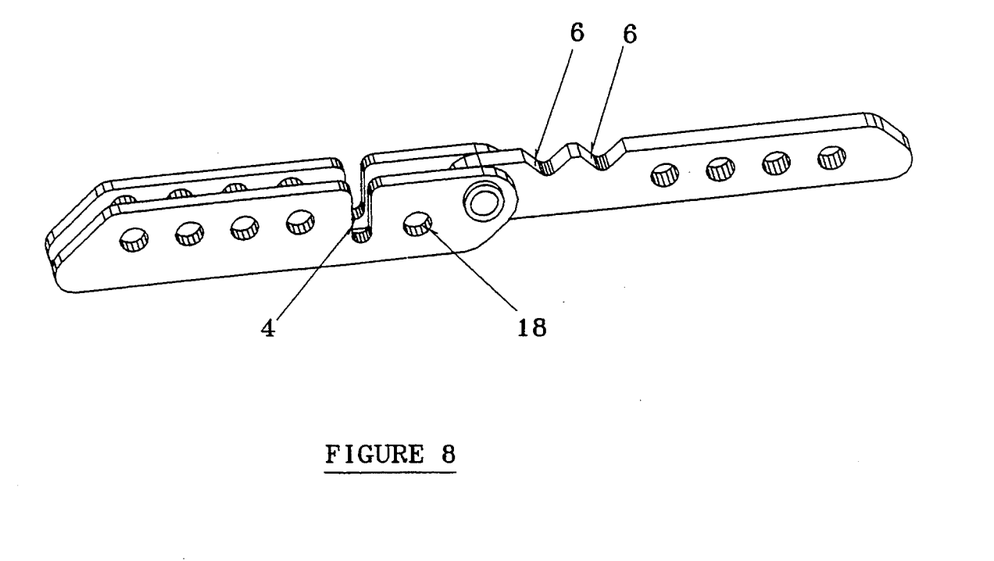
FIG. 8 an elevated side view of a scissors-type clamp of the present invention which has both a through slot (4) and a through hole (18) in which a cable(s) can be clamped.

In another embodiment of the present invention, illustrated in FIG. 8, the first section of the scissors-type clamp has at least one through slot 4 and at least one through hole 18 which are located so that when the clamp is in a closed position, the at least one through slot 4 and at least one through hole 18 are aligned with notches 6 in the second section. In this embodiment of the present invention, a cable is inserted through at least one of the through slots and/or through holes while the clamp is in an open position. The clamp is then closed so that the notches in the second section and the at least one through slot and at least one through hole in the first section are aligned. In this closed position, the notch(es) in the second section and the bottom edges of the at least one through slot and/or at least one through hole in the first section, that are in contact with a portion of the cable, will exert force on the cable, thereby clamping the cable in place.

It should be noted that the above embodiments of the present invention could be extended to assemblies using multiple cables with one scissors-type clamp. In these additional embodiments of the present invention the clamp should have (1) multiple slot/notch pairs; (2) multiple through hole/notch pairs or (3) at least one through slot/notch pair and at least one through hole/notch pair, to accommodate the multiple cables.

The present invention is also directed to clamping assemblies using multiple clamps and multiple cables in combinations that would be understood by one skilled in the art.

The cable that is used in the clamping assemblies of the present invention may be made of any material that will be securely held by the clamping action of the scissors-type clamp of the present invention. In a preferred embodiment of the present invention, the cable is composed of plastic. In a highly preferred embodiment of the present invention, the cable is a plastic coated metal cable.

The thickness or diameter of the cable should be slightly larger than the opening in the clamp that is located between the bottom (or bottom edges) of the through slot and the interior surfaces of the notch when the clamp is in a closed position. As would be understood by one skilled in the art, when the cable is slightly thicker than the above-described opening, the clamp will exert pressure on the cable when the clamp is in a closed position. The pressure exerted by the clamp on the cable prevents the cable from being pulled through the opening.

While not wishing to be bound by any theory concerning the clamping action of the clamping devices of the present invention, it is believed that the scissors-type clamps of the present invention are able to hold the cable(s) in place while the clamps are in a closed position because the cable(s) are able to bend and/or deform slightly when the clamp exerts pressure on the cable(s). The slight bending or deformation of the cable(s) in combination with the friction generated between the clamping surfaces and the cable(s), is sufficient to hold the cable(s) in place even when an amount of force is applied to the cable(s) which would pull the cable(s) out of the through slot(s) or through hole(s) when the clamp is not in a closed position. It is believed that this theory explains why the most preferred type of cable for use in the clamping assemblies of the present invention is plastic coated metal cable. Specifically, when this type of cable is used in the clamping assemblies of the present invention, the pressure exerted by the clamping surfaces acts to both bend the cable and slightly deform the plastic surface of the cable, thus necessitating the use of a great deal of force to pull the cable through the clamp.

When the cable used in the clamping assembly of the present invention has a looped end, the loop can be formed in any suitable manner such as, for example, using a small clamping device to hold two sections of the cable together or by simply tying a knot in one end of the cable.

The scissors-type clamp of the present invention may also be made of any suitable material such as, for example, metal or plastic. In a preferred embodiment of the present invention, the clamp is made of plastic (e.g., polymeric material). The means for pivotally attaching the first section of the clamp to the second section may be any suitable means such as, for example, a metal or plastic rivet. In a highly preferred embodiment of the present invention, the clamp is made of plastic and the first section of the clamp is pivotally attached to the second section of the clamp by a metal rivet.

The scissors-type clamp and clamping assemblies of the present invention may be used for many purposes. For example, the clamping assemblies of the present invention can be used as lockout devices for securing valves, power switches, etc., both in the home and in industry. Further, the clamping assemblies can be used to secure an object or objects to a fixed object by wrapping the cable around (or passing the cable through) both the object or objects to be secured and the fixed object and then securing the free end or ends of the cable with the scissors-type clamp in a manner that would be understood by one skilled in the art. Moreover when a locking device is used in combination with the clamping assembly (e.g., by passing the shank of the locking device through one of the aligned sets of through holes in the scissors-type clamp as described above), the clamping assembly can be used to lock an object(s) to a fixed object or lock together several objects that are connected by the cable. When even greater security is desired, multiple locking devices can be used with the clamping assembly by, for example, inserting the shanks of several locking devices into multiple through holes on the clamp. In this embodiment of the present invention, the number of locking devices that can be used with a single scissors-type clamp is limited only by the number of sets of aligned through holes in the clamp.

As discussed earlier in this application, when the scissors-type clamps of the present invention are in a closed position the through holes in the first and second sections are aligned so that a member can be inserted through one or more of the corresponding set(s) of through holes. When a member (e.g., a pin, peg, straight rod, curved rod, shank of a lock, or any other object that will pass through and remain within the through holes) is so inserted through a set of through holes) the clamp is prevented from opening (i.e., the clamp is fixed or secured in a closed position). Although the use of a member in this manner is a preferred embodiment of the present invention, it is not necessary to insert a member through a set of corresponding through holes in order to fix the clamp in a closed position. Specifically, the attachment means (i.e., for pivotally attaching the first section to the second section) can be designed so that a significant amount of force is required to open the clamp from a closed position. In this embodiment of the present invention, it is not necessary to insert a member through a set of corresponding through holes to maintain the clamp in a closed position for most purposes (i.e., the amount of force required to open the clamp is greater than the normal amount of force that would be experienced during a particular use .for the clamp, such as tying several objects together with a cable). Alternatively, the clamp can have a latching means which prevents the clamp from opening when the latch is shut. When a latching means is used, it is preferred that the latching means is located on the front end of the clamp (i.e., the opposite end from the pivotal attachment point) or on either side of the clamp (or on both sides of the clamp). The latching means may be used with or without a locking means. When a locking means is used with the latching means, the locking means may be similar to the locking means described above (e.g., the shank of a lock is passed through a set of corresponding through holes in the first and second sections of the clamp), or the locking means may be a part of the latching means. For example, the latching means itself may be equipped with through holes through which a member can be inserted so as to lock the latch in a shut position and therefore lock the clamp in a closed position. Accordingly, although the use of a member which is inserted through a corresponding set of through holes in the first and second sections of the scissors-type clamp is a preferred embodiment of the present invention, it would be understood by one skilled in the art that any means for maintaining the scissors-type clamp in a closed position would be within the scope. of the present invention.

Figure 9:
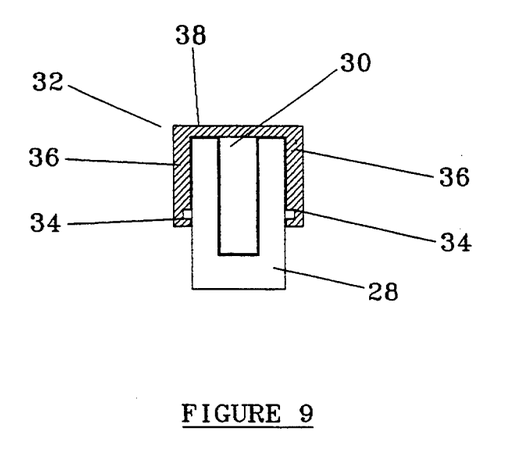
FIG. 9 is a direct frontal view of a scissors-type clamp of the present invention wherein the clamp has a latching means.

One simple example of a clamp with a latching means is illustrated in FIG. 9. In this figure, a scissors-type clamp with a latching means is shown in closed position from a direct frontal view down the length of the clamp. The first section of the clamp is indicated as 28. The second section of the clamp is indicated as 30. A U-shaped piece 32 which is indicated with hatched lines is attached to the second section 30. A peg 34 protrudes from each side of the first section 28. The two sides 36 of the U-shaped .piece 32 are attached to the top of the U-shaped piece 38 in such a manner that when the two sides 36 of the U-shaped piece come into contact with the pegs 34, the sides 36 can be pulled backwards or forwards to latch onto the pegs 34. The sides 36 can grip the pegs 34 by a pressure fit or the sides 36 can have slots which grip the pegs 34. As would be understood by one skilled in this art, there are many different types of latching means that could be used with the clamps of the present invention. The embodiment shown in FIG. 9 is not intended to be limiting. All other types of latching means known to those skilled in this art are considered to be within the scope of this invention.

It is also possible to use one or more of the through holes of the scissors-type clamps of the present invention as a means for fastening or fixing the clamping assembly to another object. For example, a pin or rod can be inserted through one of the aligned sets of through holes while the clamp is in a closed position and, while the pin or rod in so inserted, one or both ends of the pin or rod can be attached to another object (such as a pegboard or a hole in a wall or other surface). When a curved rod or hook is inserted through one or more of the aligned sets of through holes in the clamp, it is possible to use the free end or ends of the curved rod or hook to attach the clamping assembly to another object or objects (e.g., the bed or wall of a truck or a nearby wall or ceiling in a room).

In one embodiment of the present invention the scissors-type clamp has at least one flange attached to the first or second sections of the clamp wherein the flange has through holes which can be used to fix or anchor the clamp to another object(s). For example, the through holes of the flange could be used as screw holes for securing the clamp to another object(s) (e.g., a wall, a boat dock, a truck bed, etc).

Although several specific means have been described for fixing or attaching the scissors-type clamp to another object(s), applicant does not intend these specific listed embodiments to be limiting. Any means for attaching or fixing the scissors-type clamps or clamping assemblies of the present invention to another object(s) that would be within the skill of those in the art is considered to be within the scope of the present invention.

The member used to secure the scissors-type clamp in a closed position can be attached to the clamp for easy accessibility. Moreover, the member can be secured to the clamp (e.g., by a wire or chain) so that it will always be close at hand when needed. This embodiment of the present invention is especially preferred when the member is a relatively small Peg pin or rod.

It would be understood by one skilled in the art that the scissors-type clamps and clamping assemblies of the present invention have many uses that are not described herein. Applicants do not wish to be limited to the specifically described embodiments of the present invention, which have been presented for illustration purposes only and are not intended to be a complete listing of the various embodiments and uses of the scissors-type clamps and clamping assemblies of the present invention.

Many methods can be used to construct the scissors-type clamps of the present invention. In a preferred embodiment of the present invention, the first and second sections of the clamps are produced separately and are then attached or connected to each other by passing an attachment means (e.g. a rivet or pin) through both the first and second sections of the clamp at the pivotal attachment point. In another preferred embodiment of the present invention, one of the two sections is provided with at least one knob and the other section is provided with a corresponding hole or cavity for each knob. The two sections are then forced together so that the knob or knobs on one section snap into the corresponding hole(s) (or cavity/cavities) in the other section. This latter embodiment of the present invention could be performed while at least one of the two sections is at an elevated temperature (i.e., above ambient temperature). Finally in another preferred embodiment of the present invention, the attachment means could be a plastic rod which is inserted through the first and second sections of the clamp at the pivotal attachment point. The plastic rod can then be at least partially melted so as to pivotally attach the two sections to one another. Alternatively, the plastic rod could be attached to either the first or second sections by the use of any glue-like material that is compatible with both the rod and the clamp.

As stated above, many methods can be used to construct the scissors-type clamps of the present invention. The specific embodiments described herein are not intended to be limiting. Any method that would be within the skill of those in the art is considered to be within the scope of the present invention.

The following examples will aid in explaining, but should not be deemed as limiting, the practice of the present invention.

It is understood that the foregoing description is given merely by way of illustration and that many variations may be made therein without departing from the spirit of this invention.

Example 1

A clamping assembly of the present invention which included a scissors-type clamp, as shown in FIG. 1, made of plastic was used to perform a lockout on three electrical switches. Specifically, the electrical switches were located one above the other and one end of each electrical switch had a small hole through it. The electrical switches are normally activated by rotating them from a three o'clock position (off) to a six o'clock position (on). To prevent all three of the switches from being turned on, a clamping assembly of the present invention was used. Specifically, the cable used was a plastic coated metal cable (total diameter about 3/16 inch and diameter of metal cable about 0.10 inch) having one free end and one looped end. As stated above, the scissors-type clamp used is shown in FIG. 1 and was made of plastic (polymeric material). The clamp, in an open position (180° open from the closed position) measured about 6.25 inches in length. The first section of the clamp was one inch tall, 3.5 inches long and 10/16 inches wide. The channel in the first section was centered through the width of the first section and was 0.25 inches wide, 0.75 inches deep and extended through the length of the first section. The through slot was cut through each of the walls of the channel from the top of the first section to slightly above the bottom of the channel (about 1 mm above the bottom of the channel). The second section of the clamp was about 3.5 inches long, 0.75 inches tall and just under 0.25 inches wide. The notch in the second section was U-shaped and was about 5/16 inches wide at the top of the notch and about 2/16 inches wide at the bottom of the notch. The notch was about 0.15 inches deep at the deepest point.

The free end of the cable was passed through each of the holes in the three switches. After the free end was passed through the hole in the third switch, the cable was pulled through the three holes until the looped end of the cable was pulled tight against the hole in the first switch (i.e., the looped end of the cable was too large to pass through the hole in the first switch). The free end of the cable located above the third switch was then placed in the through slot of the scissors-type clamp and the clamp was moved along the cable until the clamp was in contact with the third switch. The clamp was then closed over the cable so that the notch in the second section of the clamp and the bottom edges of the through slot in the first section of the clamp were pressed tightly against the cable. With the clamp in this closed position, the through holes of the first section of the clamp were aligned with the through holes in the second section of the clamp (i.e., light could be seen passing through the aligned through holes). The curved shank of a padlock was passed through the second set of through holes (i.e., the through holes located furthest away from the pivotal attachment point) and the lock was then closed.

In this setup, the three electrical switches were locked in the off position.

Example 2

A clamping assembly of the present invention which included a scissors-type clamp as described in Example 1 was used to perform a lockout on two valves. Specifically the two valves were located about six inches apart on an industrial apparatus. One valve was a lever-type valve and the other valve was a screw-type valve with a circular handle. The cable used was the same cable that is described in Example 1.

The free end of the cable was passed through a hole in the end of the lever-type valve and then through an open section of the interior of the screw-type valve (i.e., within the circle defined by the outer edges of the circular handle). The free end of the cable was then passed around a nearby stationary object (i.e., part of a large motor) before being passed through the looped end of the cable. The free end of the cable was then pulled through the looped end of the cable until the cable was tight. Once the cable was tight, the free end of the cable was passed through the through slot of the clamp and the clamp was moved along the cable until it was in contact with the looped end of the cable. The clamp was then closed over the cable as described in Example 1 and the curved shank of a lock was passed through the second set of through holes and the lock was then closed (as described in Example 1).

In this setup, both of the valves were locked in an open position. That is, the lever-type valve could not be moved and the screw-type valve. could not be turned.

Example 3

Several compressed gas tanks were secured to a wall by passing the free end of a plastic coated metal cable having a free end and a looped end through an eyelet which was secured to the wall and then passing the cable around the tanks. The free end of the cable was then passed through the looped end and the cable was pulled tight around the tanks. A scissors-type clamp of the present invention was then attached to the cable at the point where the free end of the cable passed through the looped end of the cable by sliding the cable into the through slot of the clamp while the clamp was in an open position and then closing the clamp on the cable and inserting a pin into one of the aligned sets of through holes to fix or secure the clamp in a closed position. With the clamp fixed in the closed position, the free end of the cable could not pass back through the looped end and the clamping assembly (i.e., scissors-type clamp and cable) securely held the tanks to the wall.

Example 4

A spare tire (i.e., wheel and tire) was securely attached to the exterior of a car by passing the free end of a plastic coated metal cable (having a free end and a looped end) through an opening in the wheel and then through a hole on a carrier flange on the exterior of the car. The free end of the cable was then passed through the looped end of the cable and the cable was pulled tight against the tire. A scissors-type clamp of the present invention was then attached to the cable at the point where the free end of the cable passed through the looped end as described in Example 3. After a pin was inserted into one of the aligned sets of through holes, the spare tire was securely attached to the exterior of the car. The spare tire could be locked in place by passing the shank of a locking device (e.g., a padlock) through one of the aligned sets of through holes in the clamp and then closing the lock (i.e., in a locked position).

Example 5

Several loose items could be secured in the back of a pickup truck by passing a plastic coated metal cable through a hole in a flange in one side of the pickup truck and through at least one hole in each of the loose items. The plastic coated metal cable could then be passed through a hole in a flange on the opposite side of the truck and the two free ends of the cable brought together and pulled tight. Each of the loose ends would then be placed into a through slot (or through hole) while the clamp was in an open position and then the clamp would be closed so that the two free ends would be clamped within the through slot(s) and/or through hole(s). A member would then be inserted into one of the aligned sets of through holes so that the clamp is secured in a closed position.

What is claimed is:

1. A scissors-type clamp comprising a first section and a second section which are pivotally attached at a pivotal attachment point wherein said first section has a channel which engages said second section when said clamp is in a closed position, said first section and said second section each having at least one through hole disposed so that said at least one through hole of said first section and said at least one through hole of said second section are in alignment when said clamp is in said closed position, said first section also having at least one through slot located between the pivotal attachment point and said at least one through hole, said through slot forming a passageway through said channel in said first section and said second section having at least one notch which is disposed so that when said clamp is in said closed position said at least one notch is aligned with said at least one through slot.

2. A clamping assembly comprising the scissors-type clamp of claim 1 and a length of cable, said cable passing through said at least one through slot in said first section and said cable being engaged by said notch in said second section when said clamp is in said closed position.

3. The clamping assembly of claim 2, wherein said cable is selected from the group consisting of metal cable, plastic cable and plastic coated metal cable.

4. The clamping assembly of claim 2, wherein said assembly additionally comprises a member which is inserted through a corresponding set of said aligned through holes in said first and second sections when said clamp is in said closed position.

5. The clamping assembly of claim 4, wherein said member is selected from the group consisting of a straight rod or a curved rod.

6. The clamping assembly of claim 4, wherein said member is a pin.

7. The clamping assembly of claim 4, wherein said member is a peg.

8. The scissors-type clamp of claim 1, wherein said first and second section of said clamp consist essentially of metal or plastic.

9. A clamping assembly comprising the scissors-type clamp of claim 1 and at least one cable.

10. The scissors-type clamp of claim 1, wherein said pivotal attachment point is located at one end of the first section and said channel extends from said pivotal attachment point to the opposite end of the first section.

11. The scissors-type clamp of claim 1, wherein said second section is enclosed within said channel of said first section when said clamp is in said closed position.

12. A scissors-type clamp comprising:
a first section having a channel which is defined by two side walls and a bottom, at least one through hole which passes through both of said side walls of said channel and at least one through slot which passes through both of said side walls of said channel;
a second section having at least one through hole and at least one notch; and
a pivotal attachment point; wherein said first section and said second section are pivotally attached at said pivotal attachment point so that said channel in said first section engages said second section when said clamp is in a closed position so that said second section is located between said side walls of said channel, and further wherein, when said clamp is in said closed position, said at least one through hole of said first section is aligned with said at least one through hole of said second section and said at least one through slot of said first section is aligned with said at least one notch of said second section.

13. The scissors-type clamp of claim 12, wherein at least one of said at least one through slot is a cable through hole wherein said cable through hole is aligned with a notch of said second section.

14. The scissors-type clamp of claim 12, wherein said first and second sections of said clamp consist essentially of metal or plastic.

15. A clamping assembly comprising the scissors-type clamp of claim 12 and at least one cable.

16. The scissors-type clamp of claim 12, wherein said pivotal attachment point is located at one end of the first section and said channel extends from said pivotal attachment point to the opposite end of the first section.

17. The scissors-type clamp of claim 2, wherein said second section is enclosed within said channel of said first section when said clamp is in said closed position.

18. A scissors-type clamp comprising:
a first section having a channel which is defined by two side walls and a bottom, at least one through hole which passes through both of said side walls of said channel and at least one notch;
a second section having at least one through hole and at least one through slot; and
a pivotal attachment point; wherein said first section and said second section are pivotally attached at said pivotal attachment point so that said channel in said first section engages said second section when said clamp is in a closed position so that said second section is located between said side walls of said channel, and further wherein, when said clamp is in said closed position, said at least one through hole of said first section is aligned with said at least one through hole of said second section and said at least one through slot of said second section is aligned with said at least one notch of said first section.

* * * * *

UNITED STATES PATENT AND TRADEMARK OFFICE
CERTIFICATE OF CORRECTION

PATENT NO. : 5,440,789
DATED : August 15, 1995
INVENTOR(S) : Lofland

It is certified that error appears in the above-indentified patent and that said Letters Patent is hereby corrected as shown below:

Column 10, claim 8, line 2, "section" should read --sections--; and column 12, claim 17, line 1 "claim 2," should read --claim 12,--.

Signed and Sealed this

Ninth Day of July, 1996

Attest:

BRUCE LEHMAN

*Attesting Officer*   *Commissioner of Patents and Trademarks*